United States Patent
Purvis

(10) Patent No.: US 6,244,045 B1
(45) Date of Patent: Jun. 12, 2001

(54) METHOD OF MONITORING EFFICIENCY OF A CATALYTIC CONVERTER AND A CONTROL SYSTEM SUITABLE FOR USE IN THE METHOD

(75) Inventor: Ralph Purvis, Norfolk (GB)

(73) Assignee: Lotus Cars Limited, Norfolk (GB)

( * ) Notice: Subject to any disclaimer, the term of this patent is extended or adjusted under 35 U.S.C. 154(b) by 0 days.

(21) Appl. No.: 09/530,331

(22) PCT Filed: Oct. 30, 1998

(86) PCT No.: PCT/GB98/03286

§ 371 Date: Aug. 14, 2000

§ 102(e) Date: Aug. 14, 2000

(87) PCT Pub. No.: WO99/23371

PCT Pub. Date: May 14, 1999

(30) Foreign Application Priority Data

Oct. 30, 1997 (GB) .................................................. 9722950

(51) Int. Cl.[7] ..................................................... F01N 3/00
(52) U.S. Cl. ................................. 60/274; 60/276; 60/277; 60/285
(58) Field of Search .............................. 60/274, 276, 285, 60/277; 701/109

(56) References Cited

U.S. PATENT DOCUMENTS

| | | | |
|---|---|---|---|
| 5,088,281 | * | 2/1992 | Izutani et al. ........................ 60/274 |
| 5,099,646 | * | 3/1992 | Nada ..................................... 60/274 |
| 5,127,225 | * | 7/1992 | Nada ..................................... 60/274 |
| 5,157,919 | | 10/1992 | Gopp . |
| 5,172,320 | * | 12/1992 | Nada ............................... 364/431.05 |
| 5,303,548 | * | 4/1994 | Shimizu et al. ....................... 60/277 |
| 5,433,071 | * | 7/1995 | Willey et al. .......................... 60/274 |
| 5,487,269 | | 1/1996 | Atanasyan et al. . |
| 5,647,204 | | 7/1997 | Atanasyan . |

FOREIGN PATENT DOCUMENTS

| | | |
|---|---|---|
| 35 00 594 | 7/1986 | (DE) . |
| 0 466 311 | 1/1992 | (EP) . |
| WO 93/09335 | 5/1998 | (WO) . |

* cited by examiner

Primary Examiner—Thomas Denion
Assistant Examiner—Binh Tran
(74) Attorney, Agent, or Firm—Westman, Champlin & Kelly, P.A.

(57) ABSTRACT

In a first aspect of the present invention there is provided a method of monitoring efficiency of a catalytic converter (14) present in an exhaust system (12) of an internal combustion engine (10) which has a closed loop control system (15, 23, 24) which in normal use of the engine controls richness of fuel/air charge supplied to a combustion chamber of the engine (10). The closed loop control system uses a feedback signal an output signal of an exhaust gas oxygen sensor (15) located in the exhaust system (12) downstream of at least a part of the volume of the catalytic converter (14). The method comprises the steps of: interrupting the normal operation of he engine (10) by stopping the closed loop control of the richness of the fuel/air charge; commencing open loop control of the richness of the fuel/air charge supplied to the combustion chamber; varying the richness of the fuel/air charge in an oscillatory manner during the open loop control by generating an oscillating open loop control signal; and using the output signal of the oxygen sensor (15) during open loop control to evaluate the efficiency of the catalytic converter (14). In a second aspect the present invention provides a control system which can operate according to the method.

14 Claims, 3 Drawing Sheets

METHOD OF MONITORING EFFICIENCY OF A CATALYTIC CONVERTER AND A CONTROL SYSTEM SUITABLE FOR USE IN THE METHOD

The present invention relates to a method of monitoring efficiency of a catalytic converter present in an exhaust system of an internal combustion engine which has a closed loop control system which in normal use of the engine controls richness of fuel/air charge supplied to a combustion chamber of the engine, the closed loop control system using as a feedback signal an output signal of an exhaust gas oxygen sensor located in the exhaust system downstream of at least a part of the volume of the catalytic converter. The present invention also relates to a control system which controls richness of fuel/air charge supplied to a combustion chamber of an internal combustion engine and which monitors efficiency of a catalytic converter in the exhaust system receiving exhaust gas from the combustion chamber.

The motor industry commonly refers to Air Fuel Ratios that contain excess air, and thus oxygen, as weak. Conversely Air Fuel ratios with excess fuel are referred to as rich. Strictly speaking it is a relative term with no absolute values, but in the case of catalyst operation the dividing line is generally taken to be Stoichiometric, the theoretical ratio where all the fuel is burnt together with all the available oxygen. For normal petrol this occurs at a ratio of 14.7:1. Thus for catalyst operation a weak mixture will be an Air Fuel Ratio in excess of 14.7:1, a rich mixture will be less than 14.7:1. Throughout the specification and claims when a mixture is referred to as rich then it will be a mixture with an excess of fuel and when a mixture is referred to as weak it will be a mixture with an excess of oxygen.

In a petrol internal combustion engine three main pollutants are produced: unburnt hydrocarbons (HC), carbon monoxide (CO) and oxides of nitrogen (NOx). In order to remove these poisonous gases from the exhaust gases of the internal combustion engine the HC and CO must be oxidised to respectively form $H_2O$ and $CO_2$. Also, the Nox must be reduced to $N_2$ and $O_2$. Since oxidation and reduction are opposite chemical processes the removal of all pollutants from exhaust gases represents a significant challenge.

In order to meet the challenge internal combustion engine control systems the richness of the fuel/air charge supplied to combustion chambers of the internal combustion engine is cyclically varied from a weak mixture to a rich mixture, which results in the exhaust gases produced by the combustion having a varying oxygen content, the percentage amount of oxygen in the exhaust gases being relatively higher when the fuel/air mixture is weak than when the fuel/air mixture is rich. The cycling of the Air Fuel Ratio for correct catalyst operation would be typically from a weak extreme of 15.2:1 to a rich extreme of 14.2:1. It is important for the efficiency of the engine that the fuel/air ratio of the fuel/air charge supplied to the combustion chambers is held very close to stoichiometric. To achieve this level of control it has been necessary to use a closed loop control system which uses as a feedback signal an output signal of an oxygen sensor located in the exhaust system.

When the closed loop control system is operating, as soon as the oxygen sensor in the exhaust system recognises that the oxygen content of the exhaust gas mixture indicates that the fuel/air mixture supplied to the combustion chamber is weak, then the control system for controlling the richness of the fuel/air charge mixture to the combustion chamber acts to increase the richness of the fuel/air charge (i.e. to increase the ratio of fuel to air). The control system continues to increase the richness of mixture of the fuel/air charge until the oxygen sensor senses an oxygen content in the exhaust gases which indicates that a rich fuel/air mixture is being supplied to the combustion chambers.

When the sensor recognises that the oxygen content of the exhaust gases indicates that there is a rich fuel/air mixture supplied to the combustion chambers, then the control system for controlling the richness of the fuel/air charge weakens the richness of the fuel/air charge (i.e. reduces the ratio of fuel to air). The richness of the fuel/air charge is then further weakened by ramping down the amount of fuel mixed with the incoming air until the oxygen sensor in the exhaust system again notes that the oxygen content of the exhaust gas mixture indicates that a weak fuel/air mixture is being supplied to the combustion chambers. The process is continuous, with the richness of the fuel/air charge continually oscillating about stoichiometric. This results in the desired degree of control. Control can be improved by careful setting of the ramping rates for increase and decrease of the richness of the fuel/air mixture and particularly important are the initial shifts in the degree of richness once the oxygen sensor has noted an oxygen content which indicates a rich or lean fuel/air mixture. These factors also have a significant effect on the cycling frequency and amplitude of the control system.

In most prior art control systems, the oxygen sensor in the exhaust system is located in front of all of the catalyst volume in the exhaust system. However, in some prior art systems the oxygen sensor is located in the exhaust system downstream of a small starter catalytic converter but upstream of a larger volume normal running catalytic converter. The location of the oxygen sensor downstream of the small starter catalytic converter has the effect of slowing down the cycling frequency but the small starter catalytic converter will protect the oxygen sensor from substances which can poison the sensor, thus improving durability of the sensor.

A conventional method of monitoring the efficiency of a catalytic converter in an exhaust system does not disturb the normal closed loop control of the richness of the fuel/air charge, described above. Instead, the conventional method passively monitors the output signal of a second oxygen sensor present in the exhaust system to determine the efficiency of the catalytic converter by using a correlation between oxygen storage and converter efficiency.

In prior art systems which have a closed loop control system for controlling the richness of the fuel/air charge based upon the output signal of an oxygen sensor located upstream of all catalytic converters in the exhaust system, then the second oxygen sensor used for monitoring catalytic converter efficiency is normally located just downstream of the catalytic converter which is monitored. An efficient catalytic converter will absorb oxygen and therefore the output of an oxygen sensor mounted downstream of the catalytic converter will be significantly damped when compared to the output of the controlling oxygen sensor upstream of the catalytic converter. An algorithm is used to measure the degree to which the output of the second oxygen sensor is damped in comparison with the output of the controlling oxygen sensor used by the closed loop control system. The condition of the monitored catalytic converter can then be determined by making a comparison of the is degree of damping with tables stored in the memory of the control system. The tables will be determined during calibration of the system.

In prior art systems in which the controlling oxygen sensor providing the feedback signal for closed loop control is located downstream of a catalytic converter, then the second oxygen sensor for measuring the performance of the catalytic converter is located upstream of the catalytic converter, i.e. with no catalytic converter present in the exhaust system upstream of the second oxygen sensor. Because the controlling sensor is behind the catalytic converter being monitored, the output of the second oxygen sensor will not be damped in comparison to the output of the controlling oxygen Sensor. However, the switching frequency of the controlling oxygen sensor will be affected by gas transit time through the catalytic converter and also by a phase lag resulting from oxygen storage in the catalytic converter. From a comparison between the output signal of the second oxygen sensor and the output signal of the controlling oxygen sensor the phase lag resulting from oxygen storage in the catalytic converter can be determined. The phase lag is then compared to stored calibration tables and thus the condition of the catalytic converter is ascertained.

In U.S. Pat. No. 5,157,919, a method of monitoring the performance of a catalytic converter is described which is different to the two standard methods which have already been mentioned. The method is different because it is intrusive, i.e. it disturbs the normal closed loop operation of the closed loop control system controlling the richness of the fuel/air mixture supplied to the combustion chamber. In the described method the controlling sensor of the closed loop control system is located downstream of the catalytic converter. As described above, during normal control of the engine, the richness of the fuel/air mixture supplied to the combustion chambers is cyclically varied about stoichiometric with ramping rates chosen to maximise efficiency. As also mentioned above, variation of the ramping rates during closed loop control of the richness of the fuel/air mixture supplied to the combustion chambers will have a significant effect upon the cycling frequency of the closed loop control and also upon the variation in amplitude of the control signal produced by the closed loop control system.

In U.S. Pat. No. 5,157,919 it is recognised that the catalytic converter in the exhaust system will impose a phase lag on the output signal of the controlling oxygen sensor and also it is recognised that the oxygen storage capacity of the catalytic converter will have an impact on the cycling frequency and the amplitude of the closed loop control signal. The monitoring method of U.S. Pat. No. 5,157,919 changes the ramping rates used by the closed loop controller and/or changes the amount by which the richness of the fuel/air charges are initially varied when the controlling oxygen sensor notes an oxygen content in the exhaust gases which indicates a rich or a weak fuel/air mixture. By observing the effects of this variation upon cycling frequency and on amplitude of the output signal of the oxygen sensor, the monitoring system in U.S. Pat. No. 5,157,919 determines the phase lag between the control signal for controlling the richness of the fuel/air mixture and the output signal of the controlling oxygen sensor and thereby determines the oxygen storage capacity of the catalytic converter. The determined oxygen storage capacity of the catalytic converter is then used as a measure of the efficiency of the catalytic converter. Throughout the monitoring of the efficiency of the catalytic converter the closed loop control of the richness of the fuel/air charge is maintained.

The present invention provides a method of controlling richness of fuel/air charge supplied to a combustion chamber of an internal combustion engine and of monitoring efficiency of a catalytic converter present in an exhaust system of the internal combustion engine receiving exhaust gas from the combustion chamber, the method comprising:

closed loop control of the fuel/air charge supplied to the combustion chamber of the engine during normal use of the engine, the closed loop control system using as a feedback signal an output signal of an exhaust gas oxygen sensor located in the exhaust system;

interrupting the normal closed loop control of the richness of the fuel/air charge by commencing open loop control of the richness of the fuel/air charge supplied to the combustion chamber; and varying the richness of the fuel/air charge in an oscillatory manner during the open loop control by generating an oscillating open loop control signal; and using the output signal of an oxygen sensor in the exhaust system during open loop control to evaluate the efficiency of the catalytic converter; characterised in that a single oxygen sensor located downstream of at least a part of the volume of the catalytic converter is used to provide the feedback signal during the closed loop control and to provide, during open loop control, the output signal used to evaluate the efficiency of the catalytic converter.

Preferably the oscillating open loop control signal is not used to control the richness during normal closed loop control. Preferably during open loop control a control signal is used for controlling the richness which is a combination of the oscillating open loop control signal and a closed loop control signal produced by the closed loop control system. Alternatively, during open loop control the oscillating open loop control signal is used on its own to control richness.

It can be seen that in the method of the present invention the normal closed loop control of the richness of the fuel/air charge supplied to the combustion chamber is interrupted. The method then uses a generated open loop control signal to control the richness of the fuel/air charge and this open loop control signal will oscillate the richness of the fuel/air charge about stoichiometric in a manner similar to the way in which the richness of the fuel/air charge is oscillated in prior art systems by closed loop control using a feedback signal from an oxygen sensor upstream of a catalytic converter. To operate the method only one oxygen sensor is needed and this is located downstream of the monitored catalytic converter. The output signal of the oxygen sensor is used to evaluate the efficiency of the catalyst in a manner similar to the way in which in some prior art systems two output signals are compared from a controlling oxygen sensor located before a catalytic converter and a monitoring sensor located after the catalytic converter. In the present method the output signal which would have been produced by the controlling sensor upstream of the catalyst is instead replaced by the open loop control system signal and the output signal which would have been provided in the prior art by the second monitoring oxygen sensor downstream of the catalytic converter which is used in the normal closed loop control of the richness of the fuel/air mixture.

Preferably the method includes the steps of:

running the engine for a period with the closed loop control system in normal operation in order to establish steady state operating conditions; and testing for steady state operating conditions; and interrupting the normal operation of the engine and commencing open loop control of the richness of the fuel/air charge only after the testing has established that steady state operating conditions exist.

In order for the diagnostic test of the method to operate correctly without errors, the test has to be carried out during steady state operating conditions within preset parameters of engine operation.

Preferably the engine is used to power a land vehicle and the testing for steady state operating conditions comprises:

measuring temperature of the monitored catalytic converter and determining whether the measured catalyst temperature is within predefined catalyst temperature limits;

measuring temperature of liquid coolant in the engine and determining whether the measured coolant temperature is within predefined coolant temperature limits;

measuring rate of airflow to the combustion chamber of the engine and determining whether the measured airflow is within predefined rate of airflow limits;

measuring throttle position of the throttle of the engine and determining whether the measured throttle position is above a predefined throttle position limit;

measuring manifold pressure of the engine and determining whether the measured manifold pressure is above a predefined manifold pressure limit;

measuring rate of change of the manifold pressure and determining whether the measured rate of change is below a predefined rate of change of manifold pressure limit;

measuring speed of revolution of the engine and determining whether the measured speed of revolution is above a predefined speed of revolution limit; and measuring speed of the land vehicle and determining whether the measured speed is above a predefined vehicle speed limit.

The parameters of catalyst temperature, liquid coolant temperature, rate of airflow, throttle position, manifold pressure/rate of change of manifold pressure, speed of revolution of the engine and speed of the land vehicle could either be measured directly or alternatively could be measured indirectly by deriving them from signals produced by other sensors. For instance, an estimate of catalyst temperature can be made by extrapolating from direct measurements of engine speed, inlet manifold pressure, coolant and time from engine starting. Also rate of air flow can be indirectly measured by calculating the rate of airflow from the measured engine speed, inlet manifold pressure and air inlet temperature. Furthermore, manifold pressure can be estimated from measured airflow. Throughout the specification and drawings any reference to measuring a parameter includes both direct and indirect measurement and any reference to a measured parameter includes both a directly and an indirectly measured parameter.

Preferably the output signal of the downstream oxygen sensor is used to determine the efficiency of the catalytic converter by filtering the output signal of the downstream oxygen sensor and then comparing the filtered output signal with the unfiltered output signal.

Preferably both the filtered and unfiltered output signals are sampled digitally and the comparing of the filtered output signal with the unfiltered output signal comprises subtracting each sample of the filtered output signal from each unfiltered output signal to produce remainder signals.

Preferably a damping of the output signal is estimated by eliminating all negative remainder signals and integrating all positive remainder signals to produce an integrated remainder signal.

Preferably the estimated damping is compared with a predetermined value of damping by comparing the value of the integrated remainder signal with a predefined threshold value.

Preferably the catalytic converter is noted to have failed an efficiency test if the value of the integrated remainder signal is greater than the predefined threshold value. The catalytic converter is noted to have passed the efficiency test if the value of the integrated remainder signal is less than the threshold value.

Preferably the normal closed loop operation of the engine is re-established after the efficiency of the monitored catalytic converter is established.

It will be appreciated that the monitoring operation can occur at regular intervals during use of the internal combustion engine, to monitor the performance of the catalytic converter throughout its life. When the catalytic converter has failed the efficiency test then the user of the engine can be notified, e.g. by a warning light, that the catalytic converter is no longer functioning as required.

The testing for steady state operating conditions can continue throughout the open loop control of the richness of the fuel/air charge and normal closed loop operation of the engine is re-established when the testing establishes that steady state operating conditions no longer exist.

The present invention in a second aspect provides a control system which controls richness of fuel/air charge supplied to a combustion chamber of an internal combustion engine and which monitors efficiency of a catalytic converter in an exhaust system receiving exhaust gas from the combustion chamber, the control system comprising:

a closed loop control subsystem which controls the richness of the fuel/air charge using as a feedback signal a signal output by an oxygen sensor located in the exhaust system;

an open loop control subsystem which controls the richness of the fuel/air charge by generating an oscillating open loop control signal; and a monitoring subsystem which uses an output signal of an oxygen sensor located in the exhaust system to evaluate efficiency of the catalytic converter; wherein the control system in normal working of the engine uses only the closed loop control subsystem to control the richness of the fuel/air charge; and the control system when monitoring the efficiency of the catalytic converter uses the open loop control subsystem to at least partially control the richness of the fuel/air charge and uses the monitoring subsystem to evaluate the efficiency of the catalytic converter; characterised in that a single oxygen sensor located downstream of at least a part of the volume of the catalytic converter is used to provide the feedback signal used by the closed loop control subsystem and also to provide the output signal used by the monitoring subsystem to evaluate the efficiency of the catalytic converter during open loop control.

Preferred embodiments of the present invention will now be described with reference to the accompanying drawings in which.

Figure 1:
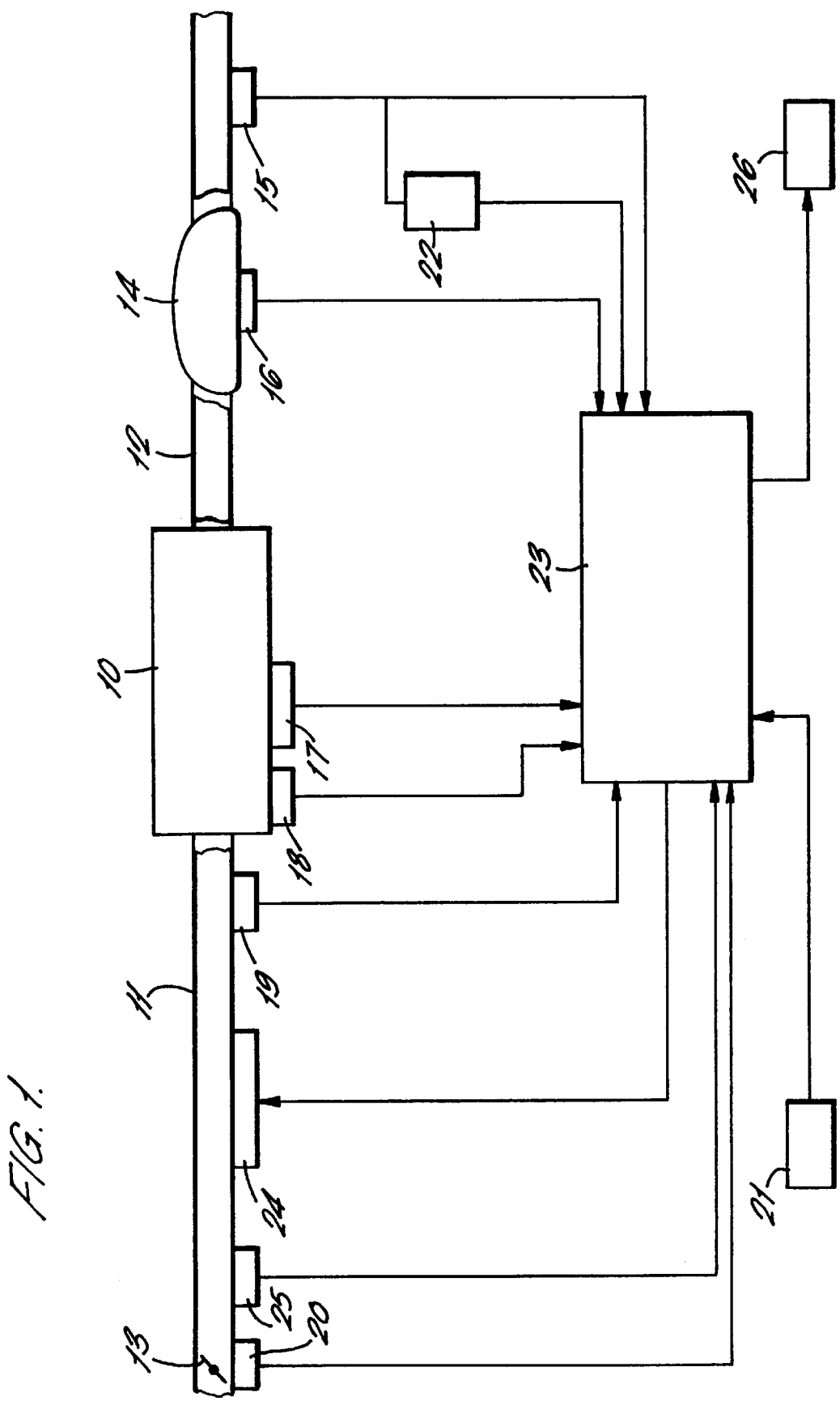
FIG. 1 is a schematic drawing showing a control system for controlling an internal combustion engine in accordance with the present invention.

Referring to FIG. 1 there can be seen schematically an internal combustion engine 10 in a road vehicle (not shown)

which receives a fuel/air charge via a manifold 11 and which exhausts combusted gases to an exhaust system 12. A throttle valve 13 is used to throttle airflow through the inlet manifold 11. A catalytic converter 14 is present in the exhaust system 12 and acts to remove poisonous gases from the exhaust system 12. The catalytic converter 14 is a three-way catalytic converter which removes from the exhaust gases unburnt hydrocarbons (HC), carbon monoxide (CO) and oxides of nitrogen (NOx).

An oxygen sensor 15 is provided in the exhaust system 12 downstream of the catalytic converter 14. The oxygen sensor 15 measures the amount of oxygen in the exhaust gases flowing out of the catalytic converter 14.

A sensor 16 is mounted to the catalytic converter 14 and measures the temperature of the catalytic converter 14. A sensor 17 is provided to measure the rotational speed of the engine 10. A sensor 18 is provided to measure the temperature of the coolant water flowing in the engine 10. A sensor 19 is provided to measure the pressure of the fuel/air charge in the inlet manifold 11 of the engine 10.

A sensor 20 is provided to measure the position of the throttle 13.

A sensor 21 is provided to measure the road speed of the land vehicle.

A sensor 25 is provided to measure airflow to the combustion chambers of the engine 10.

A filter 22 is provided to filter the output signal of the oxygen sensor 15 and to supply a filtered output signal to a controller 23. In practice the filter 22, shown for convenience separate from the controller 23, will be part of the controller 23.

The digital electronic controller 23 is provided to control the richness of the fuel/air mixture delivered to the engine 10 and also to monitor the efficiency of the catalytic converter 14. The electronic digital controller 23 receives digitally sampled signals from each of the previously described sensors 15, 16, 17, 18, 19, 20, 21 and 25. The digital controller 23 also receives a heavily filtered version of the output signal of the sensor 15 which is filtered by the filter 22. The filter 22 might not be a separate component, but instead could be a digital routine operated by the digital controller 23.

The electronic digital controller 23 controls a fuel injection system 24 which controls the richness of the fuel/air charge delivered through the inlet manifold 11 to the engine 10 for combustion in the combustion chambers of the engine 10. The digital electronic controller 23 also monitors the performance of the catalytic converter 14 and when the catalytic converter does not meet the required standard of performance then the controller 23 will activate a warning light 26 which will warn the driver of the land vehicle that the catalytic converter does not meet the required standard of performance.

The method of operation of the control system will now be described.

In normal operation of the engine 10 the richness of the fuel/air charge delivered via the inlet manifold 11 to the engine 10 is controlled by a closed loop control subsystem comprising the electronic digital controller 23, the oxygen sensor 15 and the fuel injection system 24. The controller 23 controls the fuel injection system 24 to continuously vary the richness of the fuel/air charge delivered via the inlet manifold 11 to the engine 10. The richness of the mixture is controlled in dependence upon the output signal of the oxygen sensor 15. The closed loop richness control is shown in Section A of FIG. 2 for a good performance catalyst and in Section AA of FIG. 3 for a poor performance catalyst.

As soon as the output signal of the oxygen sensor 15 indicates that the exhaust gases downstream of the catalytic converter 14 have a relatively high oxygen content which indicates that the fuel/air charge is a weak mixture then the controller 23 controls the fuel injection system 24 to increase the richness of the mixture of the fuel/air charge supplied to the engine 10 (i.e. increases the ratio of fuel to air) by first causing a shift in the richness of the mixture and then further ramping the mixture richer.

Eventually, the richness of the fuel/air mixture in the inlet manifold 11 will be ramped to such a rich mixture that the oxygen sensor 15 detects a relatively low oxygen content in the exhaust gases after the catalytic converter 14 which indicates that the fuel/air charge is a rich mixture. The output signal of the oxygen sensor 15 will indicate this. When a rich fuel/air charge is noted by the oxygen content sensed by the oxygen sensor 15 then the controller 23 will cause the fuel injection system 23 to weaken the richness of the fuel/air charge (i.e. decrease the ratio of fuel to air) in the inlet manifold 11, first by an initial shift and then by gradually ramping the mixture weaker and weaker. Eventually, the oxygen sensor 15 will note that the exhaust gases after the catalytic converter 14 again have a relatively high oxygen content indicating a weak fuel/air charge and then the process will start again. The process will operate continually during normal closed loop control of the engine so that the richness of the fuel/air mixture supplied to the engine 10 is varied cyclically with time continuously. The initial shift of the ratio of the fuel/air mixture both richer and weaker and also the ramping rates richer and weaker will have a significant effect on the engine and are critical for the correct operation of the catalyst and therefore will have to be controlled carefully by the controller 23, in a known manner.

The digital electronic controller 23 will also operate to monitor the efficiency of operation of the catalytic converter 14 by carrying out tests from the catalytic converter at regular intervals during the operation of the engine 10.

When the controller 23 commences the testing operation then first of all it will ensure that the engine 10 is working at steady state operating conditions. The controller 23 ensures this by carrying out the following series of tests:

1. The controller 23 checks the output signal of the sensor 16 and ensures that the measured catalyst temperature is within predefined limits stored in memory by the controller 23 (i.e. above a first threshold value and below a second threshold value);

2. the controller 23 checks whether the output signal of the sensor 16 indicates that the temperature of the water coolant in the engine 10 is above a predefined threshold value stored by the controller 23 in memory;

3. The controller 23 checks whether the output signal of the sensor 25 indicates that the airflow is within predetermined limits stored in the memory of the controller 23 (i.e. above a first threshold value and below a second threshold value);

4. The controller 23 checks whether the output of the sensor 20 indicates that the throttle position is above a threshold value stored in the memory of the controller 23;

5. the controller 23 ascertains whether the output signal of the sensor 19 indicates that the manifold pressure in the air inlet manifold 11 is within predetermined limits, stored in the memory of the controller 23 (i.e. above a first threshold value and below a second threshold value);

6. the controller 23 will differentiate the output signal of the sensor 19 with respect to time to derive a rate of change of manifold pressure signal and the controller 23 will check that this rate of change of manifold pressure signal is below a threshold value stored in the memory of the controller 23;

7. the controller 23 will check that the output signal of the sensor 18 indicates that the rate of revolution of the engine 10 is above a threshold value stored in the memory of the controller 23;

8. the controller 23 will check that the output signal of the sensor 21 indicates that the road speed of the land vehicle is above a threshold value stored in the memory of the controller 23.

When all of the above tests show that the sensor parameters are within predefined limits then the controller 23 will start to test the functioning of the catalytic converter 14. The controller 23 will do this by first of all interrupting the normal closed loop control of the richness of the fuel/air charge. The controller 23 will initiate control of the richness of the air/fuel mixture by an open loop control subsystem. The open loop control subsystem is "open loop" in that its control signal is produced without reference to a feedback signal, the oxygen sensor signal. The open loop subsystem generates an oscillating open loop control signal which controls the fuel injection system 24 and varies the richness of the fuel/air charge about stoichiometric in cyclical fashion.

On initiation of open loop control the fuelling would be changed by an amount (either rich or lean) but for the purpose of this example, assumed rich). The fuelling would then be further changed in the same direction at a predetermined rate each second until either an integrated airflow limit was achieved or a set period of time had elapsed. The output signal of the airflow sensor 25 could be integrated to provide a signal to be checked against a preprogrammed airflow limit. Once the airflow or time limit is reached, then the fuelling would be changed by an amount in the lean direction. The fuelling would be changed now in the lean direction at a rate each second until the same integrated airflow limit or time limit is reached. The fuelling would then be enriched again, repeating the cycle until a specified number of cycles had been completed.

Figure 2:
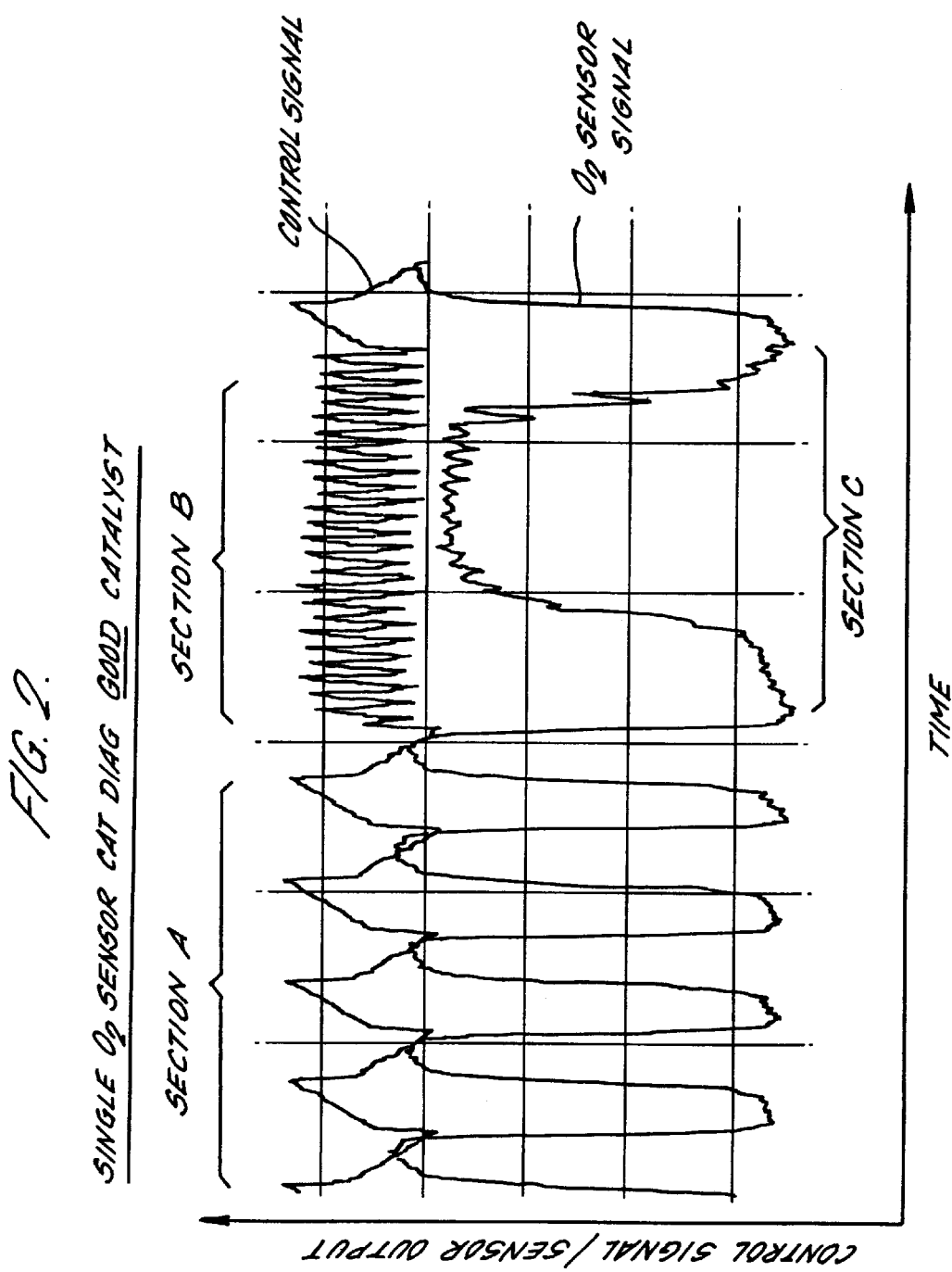
FIG. 2 is a graphical representation of a control signal generated to control richness of fuel/air mixture and the response of an oxygen sensor for a good performance catalyst.
Figure 3:
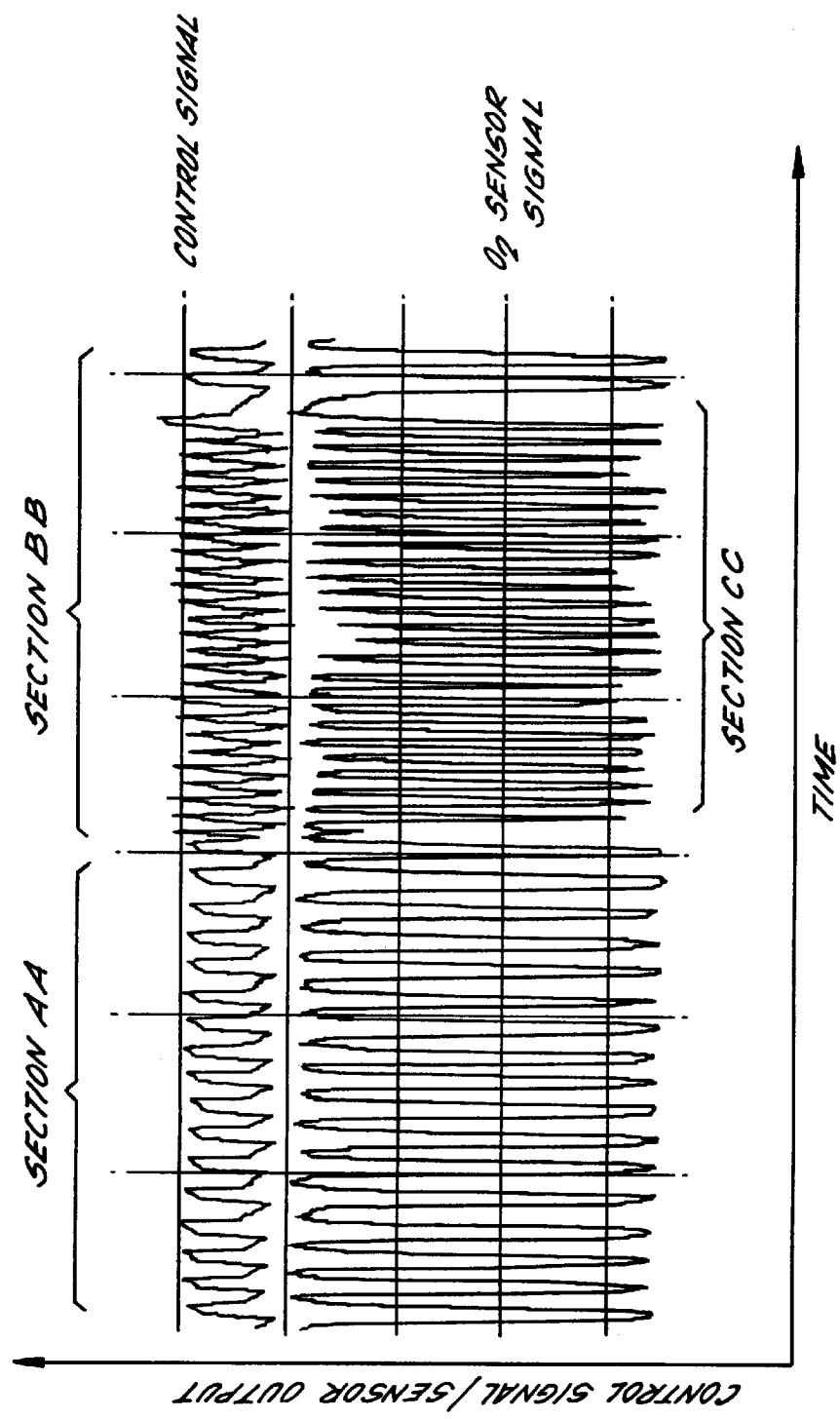
FIG. 3 is a graphical representation of a control signal generated to control richness of fuel/air mixture and the response of an oxygen sensor for a poor performance catalyst.

The open loop control signal is graphically represented in Section B of FIG. 2 and Section BB of FIG. 3. The closed loop control subsystem could be stopped completely and the open loop control signal generated by the open loop control signal could be used in isolation as the only control signal controlling richness of fuel/air mixture. However, in the preferred embodiment the closed loop control system remains operational during the generating of the open loop signal and adjusts the switch envelope or the mean value of the control signal in response to oxygen sensor output. In Section B of FIG. 2 it can be seen that the average value of the control signal is ramped gradually during open loop control.

The open loop control signal could be made dependent on the measured engine speed and inlet manifold pressure, but generally because the steady state operating conditions for the test are strictly monitored, this will not be required. The controller 23 will carry out the checks 1 to 8 above throughout the testing of the functioning of the catalytic converter 14 and will stop the test of the catalytic converter 14 if any of the checks 1 to 8 are not satisfied.

During control of the richness of the fuel/air charge by the open loop control subsystem, the output signal of the oxygen sensor 15 is used to evaluate the performance of the catalytic converter 14. The open loop control signal generated by the controller 23 is of a frequency higher than the usual frequencies of the control signal in closed loop control. This can be seen by comparing Sections A and B in FIG. 2 and Sections AA and BB in FIG. 3. The high frequency open loop signal is combined with the closed loop control signal in the preferred embodiment to produce a control signal for controlling richness which has a high frequency component attributable to the open loop control system and a ramping of mean value of the control signal which is controlled by the closed loop control signal. It can be seen from FIG. 2, Section C, that a good performance catalyst is very good at damping high frequency changes in fuel/air richness, but in FIG. 3 it can be seen at Section CC that a poor performance catalyst is bad at damping the same high frequency changes.

The controller 23 will receive via the filter 21 a heavily filtered output signal from the oxygen sensor 15 and then the heavily filtered signal, which is a digital signal, is subtracted from the unfiltered output signal of the sensor 15 to leave remainder signals. This will result usually in both negative and positive value remainder signals. The negative value signals are eliminated and the positive value signals are integrated. The integration continues until the richness of the fuel/air charge in the manifold 11 has been switched from rich to lean a specified number of times. After this, the integrated remainder signal is compared by the controller 23 with a threshold value stored in memory. If the value of the integrated remainder signal is greater than the threshold value then the catalytic converter 14 is noted to have failed the monitoring test. If the value of the integrated remainder signal is less than the stored threshold value then the condition of the catalytic converter 14 is considered to be satisfactory.

Using the above described methodology, the oxygen sensor 15 is used to estimate the degree by which the output signal has been damped. The signal should be significantly damped if the catalytic converter is working properly because the catalytic converter 14 in its operation will absorb oxygen. The integrated remainder value given by the test gives an indication of the oxygen storage capacity of the catalytic converter 14. If the oxygen storage capacity is below a specified level then failure of the catalytic converter is noted.

The open look control signal has a frequency of approximately 2 Hz and an amplitude which gives a ±5% fuelling perturbation. The open loop control would last typically for 5 seconds.

It is important to make sure that the test is carried out at the correct steady state conditions, because the specified levels stored in the memory of the controller 23 which is used for the test will have been determined by running an engine with a functioning catalytic converter at specified steady state conditions and then determining the oxygen storage capacity of the catalytic converter 14.

Once the test procedure for testing the efficiency of the catalytic converter 14 has been completed, then the controller 23 will control the richness of the fuel/air charge using only the closed loop control system, the oxygen sensor 15 being used to provide a feedback signal in the closed loop control subsystem.

The test procedure described above would run whenever the checks 1 to 8 are satisfied until such time as the testing procedure has produced a result. The procedure would not be operated again until the engine was run once more after a period of the ignition having been switched off. If the test was interrupted due to operating conditions changing, as soon as the checks 1 to 8 are satisfied again the test would start once more. If the test runs to completion, irrespective of the result, it would not operate again until the next time the engine was run (after an engine off period) and checks 1 to 8 were satisfied.

In the system proposed by the current invention it may be necessary to set,steady state condition requirements which are tighter than those required in the prior art in order to maintain adequate fuelling control during open loop operation. It is also possible that it may be necessary to learn a switching calibration for the open loop control system during normal operation of the engine, which could then be used during the test of the efficiency of the catalytic converter 14.

Whilst in the embodiment described above the oxygen sensor 15 is shown in the exhaust system 12, separate from the catalytic converter 14, it is possible that the sensor 15 could be mounted in the catalytic converter 14 to measure the oxygen in the exhaust gas flow after it has flowed through only a part of the volume of the catalytic converter 14. This can be preferable for two reasons. With the system set up to monitor the minimum practical volume of the catalytic converter, this will provide maximum integrated remainder signals at low levels of total system failure. However, the monitored volume of the catalyst must be chosen carefully so that it is not so small that catalytic converter failure is noted before the whole catalytic converter fails to such an extent that emission limits are surpassed.

It is also advantageous to monitor the performance of only a part of the volume of the catalytic converter 14 because if the monitored volume is too large the normal closed loop control subsystem will be impaired in operation because of a resulting very low switching frequency.

As mentioned previously, whilst the use of an oxygen sensor measuring oxygen in exhaust gas flow after the catalytic converter can cause problems of low switching frequencies, it does have the advantage that the sensor is protected by the catalytic converter from being poisoned by components of the exhaust gas.

Whilst in the embodiment described above a sensor 16 is provided to directly measure the temperature of the catalytic converter, instead the temperature of the catalytic converter could be indirectly measured by the controller 23 determining the temperature from the directly measured engine speed (measured by sensor 17), the inlet manifold pressure (measured by sensor 19), the engine coolant temperature (measured by sensor 18), and the time from starting of the engine (measured by an unillustrated timer).

Whilst in the embodiment described above a sensor 25 is used to directly measure airflow to the combustion chambers, the airflow can be indirectly measured by the controller 23 determining the airflow from the directly measured engine speed (measured by the sensor 17), the directly measured manifold pressure (measured by the sensor 19) and from directly measured air inlet temperature (measured by an unillustrated sensor).

The invention allows the use of one oxygen sensor in an exhaust pipe to both provide a feedback signal for closed loop control and also a measure of catalyst performance. Most prior art systems required two sensors, one for each purpose. The present invention provides a cost saving by reducing the number of sensors necessary and this is particularly noticeable for V-engines because separate catalysts are typically used for each bank of cylinders.

What is claimed is:

1. A method of controlling richness of fuel/air charge supplied to a combustion chamber of an internal combustion engine and of monitoring efficiency of a catalytic converter present in an exhaust system of the internal combustion engine receiving exhaust gas from the combustion chamber, the method comprising:

closed loop control of the fuel/air charge supplied to the combustion chamber of the engine during normal use of the engine, the closed loop control system using as a feedback signal an output signal of an exhaust gas oxygen sensor located in the exhaust system;

interrupting the normal closed loop control of the richness of the fuel/air charge by commencing open loop control of the richness of the fuel/air charge supplied to the combustion chamber; and varying the richness of the fuel/air charge in an oscillatory manner during the open loop control by generating an oscillating open loop control signal; and using the output signal of an oxygen sensor in the exhaust system during open loop control to evaluate the efficiency of the catalytic converter;

characterized in that a single oxygen sensor located downstream of at least a part of the volume of the catalytic converter is used to provide the feedback signal during the closed loop control and to provide, during open loop control, the output signal used to evaluate the efficiency of the catalytic converter.

2. A method as claimed in claim 1 wherein the oscillating open loop control signal is not used to control the richness during normal closed loop control.

3. A method as claimed in claim 2 wherein during open loop control of the richness a control signal is used for controlling the richness which is a combination of the oscillating open loop control signal and a closed loop control signal produced by the closed loop control system.

4. A method as claimed in claim 2 wherein during open loop control of the richness a control signal is used for controlling the richness which comprises solely the oscillating open loop control signal.

5. A method as claimed in claim 1 additionally including the steps of:

running the engine for a period with the closed loop control system operational in order to establish steady state operating conditions; and testing for steady state operating conditions; and interrupting the normal operation of the engine and commencing open loop control of the richness of the fuel/air charge only after the testing has established that steady state operating conditions exist.

6. A method as claimed in claim 5 wherein the engine powers a land vehicle and the testing for steady state operating conditions comprises:

measuring temperature of the monitored catalytic converter and determining whether the measured catalytic converter temperature is within predefined catalyst temperature limits;

measuring temperature of liquid coolant in the engine and determining whether the measured coolant temperature is within predefined coolant temperature limits;

measuring rate of airflow to the combustion chamber of the engine and determining whether the measured airflow is within predefined rate of airflow limits;

measuring throttle position of the throttle of the engine and determining whether the measured throttle position is above a predefined throttle position limit;

measuring manifold pressure of the engine and determining whether the measured manifold pressure is above a predefined manifold pressure limit;

measuring rate of change of the manifold pressure and determining whether the measured rate of change is below a predefined rate of change of manifold pressure limit;

measuring speed of revolution of the engine and determining whether the measured speed of revolution is above a predefined speed of revolution limit; and measuring speed of the land vehicle and determining whether the measured speed is above a predefined vehicle speed limit.

7. A method as claimed in claim 1 wherein the output signal of the downstream oxygen sensor is used to determine the efficiency of the catalytic converter by filtering the output signal of the downstream oxygen sensor and then comparing the filtered output signal with the unfiltered output signal.

8. A method as claimed in claim 7 wherein both the filtered and unfiltered output signals of the downstream oxygen sensor are sampled digitally and the comparing of the filtered output signal with the unfiltered output signal comprises subtracting each sample of the filtered output signal from each unfiltered output signal to produce remainder signals.

9. A method as claimed in claim 8 wherein a damping of the output signal is estimated by eliminating all negative remainder signals and integrating all positive remainder signals to produce an integrated remainder signal.

10. A method as claimed in claim 9 wherein the estimated damping is compared with a predetermined value of damping by comparing the value of the integrated remainder signal with a predefined threshold value.

11. A method as claimed in claim 10 where if the value of integrated remainder signal is greater than the threshold value then the catalytic converter is noted to have failed an efficiency test and if the value of the integrated remainder signal is less than the threshold value than the catalytic converter is noted to have passed the efficiency test.

12. A method as claimed in claim 1 wherein normal closed loop operation of the engine is re-established when the efficiency of the monitored catalytic converter is established.

13. A method as claimed in claim 5 wherein the testing for steady state conditions continues throughout the open loop control of the richness of the fuel/air charge and normal closed loop operation of the engine is re-established when the testing establishes that steady state operating conditions no longer exist.

14. A control system which controls richness of fuel/air charge supplied to a combustion chamber of an internal combustion engine and which monitors efficiency of a catalytic converter in an exhaust system receiving exhaust gas from the combustion chamber, the control system comprising:

a closed loop control subsystem which controls the richness of the fuel/air charge using as a feedback signal a signal output by an oxygen sensor located in the exhaust system;

an open loop control subsystem which controls the richness of the fuel/air charge by generating an oscillating open loop control signal; and a monitoring subsystem which uses an output signal of an oxygen sensor located in the exhaust system to evaluate efficiency of the catalytic converter; wherein the control system in normal working of the engine uses only the closed loop control subsystem to control the richness of the fuel/air charge; and the control system when monitoring the efficiency of the catalytic converter sues the open loop control subsystem to at least partially control the richness of the fuel/air charge and uses the monitoring subsystem to evaluate the efficiency of the catalytic converter; characterized in that a single oxygen sensor located downstream of at least a part of the volume of the catalytic converter is used to provide the feedback signal used by the closed loop control subsystem and also to provide the output signal used by the monitoring subsystem to evaluate the efficiency of the catalytic converter during open loop control.

* * * * *